United States Patent
Weir et al.

(10) Patent No.: US 7,070,696 B2
(45) Date of Patent: Jul. 4, 2006

(54) PROCESS FOR FLOCCULATING SUSPENSIONS

(75) Inventors: Steven Weir, Huddersfield (GB); Michael Green, Huddersfield (GB); John Stephen Robinson, Keighley (GB); Tony Whittaker, Bradford (GB); Malcolm Skinner, Bradford (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 83 days.

(21) Appl. No.: 10/472,790

(22) PCT Filed: Mar. 22, 2002

(86) PCT No.: PCT/EP02/03233

§ 371 (c)(1),
(2), (4) Date: Jan. 29, 2004

(87) PCT Pub. No.: WO02/081384

PCT Pub. Date: Oct. 17, 2002

(65) Prior Publication Data

US 2004/0124154 A1 Jul. 1, 2004

(30) Foreign Application Priority Data

Apr. 5, 2001 (GB) .................. 0108548.9

(51) Int. Cl.
*C02F 1/56* (2006.01)
(52) U.S. Cl. .................. 210/727; 210/734; 210/928
(58) Field of Classification Search ................ 210/609, 210/725, 727, 734, 735, 928
See application file for complete search history.

(56) References Cited

U.S. PATENT DOCUMENTS

| 4,720,346 A | 1/1988 | Flesher et al. ............ 210/734 |
| 5,405,554 A | 4/1995 | Neff et al. .................. 516/21 |
| 5,531,907 A | 7/1996 | Williams et al. ............ 210/727 |
| 5,614,102 A | 3/1997 | Sakurada .................... 210/718 |
| 5,643,461 A | 7/1997 | Neff et al. .................. 210/728 |
| 5,688,403 A | 11/1997 | Rothenberg et al. ........ 210/727 |
| 6,059,978 A | 5/2000 | Pacifici et al. ............. 210/727 |
| 6,060,164 A * | 5/2000 | Green et al. ................ 428/402 |
| 6,117,938 A * | 9/2000 | Farinato et al. ............ 524/801 |
| 6,191,242 B1 * | 2/2001 | Ryles et al. ................ 526/207 |
| 6,805,803 B1 * | 10/2004 | Weir et al. .................. 210/728 |

FOREIGN PATENT DOCUMENTS

| EP | 0534656 | 3/1993 |
| FR | 2787781 | 6/2000 |
| GB | 2082163 | 3/1982 |
| GB | 2334524 | 8/1999 |
| WO | 95/33697 | 12/1995 |
| WO | 99/40147 | 8/1999 |

OTHER PUBLICATIONS

English Abstract for FR 2787781, Jun. 2000.

* cited by examiner

*Primary Examiner*—Peter A. Hruskoci
(74) *Attorney, Agent, or Firm*—Shiela A. Loggins

(57) ABSTRACT

A process of flocculating and dewatering an aqueous suspension of suspended solids comprising, introducing into the suspension, (a) substantially linear polymer, (b) structured polymer, characterised in that the polymers are introduced into the substrate sequentially. The process brings about improvements in filtration.

6 Claims, No Drawings

PROCESS FOR FLOCCULATING SUSPENSIONS

This invention relates to processes of flocculating aqueous suspensions in order to effect separation of solids from said suspension.

It is well known to apply polymeric flocculants to aqueous suspensions in order to separate solids from the suspension. For instance it is, common practice to flocculate and then dewater suspensions containing either suspended solid organic material or mineral solids. For instance it is common practice to flocculate sludges such as sewage sludge, waste waters; textile industry effluents, red mud from the Bayer Alumina process and suspensions of coal tailings etc. Flocculants are also commonly used in paper-making processes by addition of polymeric flocculants to the cellulosic suspension. Flocculation is usually achieved by mixing into the suspension polymeric flocculant, allowing the suspended particles to flocculate and then dewatering the flocculated suspension. In papermaking this removal of water from the cellulosic suspension is often referred to as draining.

High molecular weight polymeric flocculants are commonly used for this purpose. High molecular weight flocculants may be cationic, anionic, nonionic or amphoteric in nature. The choice of polymeric flocculant will largely depend upon the substrate, which is being treated. For instance it is common practice to use high molecular weight cationic flocculants to treat aqueous suspensions comprising suspended organic material, for instance sewage sludge. In papermaking it is known to use either cationic, nonionic, anionic or amphoteric flocculants. Flocculation of mineral suspensions is frequently effected by use of anionic flocculants.

It is also known to use two different polymeric flocculants in the same process. The flocculants may have the same charge (co-ionic). For instance in commercial practice in the dewatering sewage sludge these may be co-ionic. In other processes it is known to apply two polymers of opposite charge (counter-ionic). Where two polymeric flocculants are applied to an aqueous suspension they may be added to simultaneously or more usually sequentially.

It is standard practice to apply polymers as aqueous compositions to flocculate suspensions containing suspended organic material. Generally the compositions of polymers are relatively dilute, for instance below 0.5%, often below 0.3% and usually 0.1% to below 0.2% by weight.

Linear polymer flocculants have been "structured" in the art through the use of branching or crosslinking agents. Polymer structuring is discussed by J. E. Morgan et al., Adv. Chem. Ser., Vol. 187, pp. 235–52 (1980). U.S. Pat. Nos. 4,720,346 and 4,943,378 describe the use of crosslinked cationic polymer particles having a dry particle size below 10 micrometers (microns).

U.S. Pat. Nos. 5,152,903 and 5,340,865 disclose a method of flocculating using cross-linked cationic polymer microparticles. U.S. Pat. No. 3,235,490 describes a flocculation method which utilizes crosslinked polyacrylamide. U.S. Pat. No. 3,968,037 teaches a method of releasing water from activated sewage sludge using crosslinked cationic emulsion polymers. Methods and compositions useful for thickening aqueous media are given in U.S. Pat. Nos. 4,059,552 and 4,172,066. Pending U.S. application Ser. Nos. 08/028,916, 08/028,001, 07/437,258, 08/454,974 and 08/455,419, which are assigned to assignee to this invention and are all hereby incorporated herein by reference, describe methods for flocculating suspended solids using cationic, high molecular weight, water-soluble, branched polymers.

It is known in the art to blend polymers of different characteristics in order to provide flocculants of improved characteristics. For instance, a number of workers have proposed blending inverse emulsions of high molecular weight (typically in excess of 1 million) cationic polymers with inverse emulsions of low molecular weight (below 1 million) cationic polymers, to provide flocculants of improved stability (e.g. U.S. Pat. Nos. 5,100,951 and 5,169,540) or improved dewatering properties (e.g. U.S. Pat. Nos. 5,405,554 and 5,643,461).

U.S. Pat. No. 4,943,378 discloses polymeric flocculants which have a specific viscosity above 10 (as measured by a capillary viscometer at 34 DEG C. on a 0.5% solution in deionised water) and which comprise crosslinked water-insoluble, water-swellable polymeric particles that have a dry size of below 10 .mu.m. In one embodiment these particulate flocculants may be made by blending a dissolved polymer with a particulate, generally insoluble polymer, which polymer may be made from the same monomers and differing only in the degree of crosslinking.

There is a desire to improve the efficiency of the flocculation processes. This is true in a variety of flocculation processes, including dewatering of sewage sludge, slurries of coal tailings, red mud and in papermaking.

It would therefore be desirable to provide an improved method of flocculating and dewatering aqueous suspensions of solids, in particular to to provide a process which provides faster dewatering.

This invention relates to a process of flocculating and dewatering an aqueous suspension of suspended solids comprising, introducing into the suspension, (a) substantially linear polymer,
(b) structured polymer, characterised in that the polymers are introduced into the substrate sequentially.

The polymers (a) and (b) are metered directly into the suspension as separate entities. Polymer (a) is added first then polymer (b) may be added after flocculation has commenced but should be added before the dewatering stage and before any high shear stage, such as pumping or screening stages. Thus, a blend of the two polymers are formed in the suspended solids themselves.

It may be appropriate to allow or apply some degree mixing between the dosing stages in order to allow the first polymer dose to become distributed throughout the suspension solids. This mixing may for instance include allowing the treated suspension to pass some distance along a flow line which optionally contains bends, baffles, constrictions or other features which induce gentle mixing.

Polymer (a) may be prepared by any convenient polymerisation process, for instance gel polymerisation, reverse phase suspension polymerisation, reverse phase emulsion polymerisation, composition polymerisation and the like. Thus suitable polymers may be provided in the form of granulated powders, beads, reverse-phase emulsions, reverse phase dispersions or aqueous compositions such as aqueous polymer dispersions.

Preferably polymer (a) is an aqueous preparation of a water in oil emulsion or a polymer in oil dispersion, or an aqueous polymer dispersion or an aqueous preparation of a solid grade polymer.

Polymer (b) may be prepared by any convenient polymerisation process, for instance gel polymerisation, reverse phase suspension polymerisation, reverse phase emulsion polymerisation, composition polymerisation and the like. Thus, suitable polymers may be provided in the form of reverse phase emulsions, reverse phase dispersions or granulated powders or beads.

Polymer (b) is preferably an aqueous preparation of a water in oil emulsion or a polymer in oil dispersion, or an aqueous preparation of a solid grade polymer.

The aqueous preparation of polymer (a) desirably has a concentration of polymer of below 1.0%, preferably below 0.5% by weight. More preferably the concentration of the is in the range 0.01 to 0.4%, most preferably around 0.25% by weight.

The aqueous preparation of polymer (b) desirably has a concentration of polymer of below 1.0%, preferably below 0.5% by weight. More preferably the concentration is in the range 0.01 to 0.4%, most preferably around 0.25% by weight.

When the polymer (a) or (b) is cationic, said cationic polymer may be formed by polymerisation of at least one cationic monomer alone or with other monomers. Suitable cationic monomers include quaternary ammonium or acid salts of monomers which contain amine groups. Preferably the cationic polymer is formed from a monomer or blend of monomers comprising at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride. The cationic monomers may be hompolymerised or copolymerised with other monomers, for instance acrylamide. In addition to vinyl addition polymers, the cationic polymer may include polymers obtained by condensation or addition reactions. For instance suitable cationic polymers include adducts of amines with epihalohydrins or dihaloalkanes, polyamides and polethylene imines.

In the case where the polymer (a) or (b) is anionic, said anionic polymer may be formed by polymerisation of at least one anionic monomer alone or with other monomers. Suitable anionic monomers include ethylenically unsaturated monomers comprising carboxylic acid or sulphonic acid groups. Preferably the anionic polymer is formed from a monomer or blend of monomers comprising at least one anionic monomer selected from the group consisting of (meth) acrylic acid, 2-acrylamido-2-methylpropane sulphonic acid, alkali metal and ammonium salts thereof.

If the polymer (a) or (b) is nonionic, said anionic polymer may be formed by polymerisation of suitable non-ionic monomers, for instance acrylamide or methacrylamide.

According to the invention the polymer (a) may be either cationic, anionic or non-ionic, preferably polymer (a) is cationic.

According to the invention the polymer (b) may be either cationic, anionic or non-ionic, preferably polymer (b) is cationic.

Structured or non-linear polymers are usually prepared by inclusion of polyethylenically unsaturated monomers or diethylenically unsaturated monomers, such as methylene-bis-acrylamide into the monomer mix, for instance as given in EP-B-202780.

The amount of crosslinking agent used may be from 1 to 100 ppm, based on the polymerisable monomers.

When polymer (b) is cationic, and in particular when it is a copolymer of acrylamide with at least 5%, and preferably at least 10%, by weight dialkylamino alkyl acrylate (generally as acid addition or quaternary ammonium salt), the degree of non-linearity is preferably such that the polymer has an ionic regain (IR) of at least 15%.

IR is calculated as $(x-y)/x$ multiplied by 100, where x is the ionicity measured after applying standard shear and y is the ionicity of the polymer before applying standard shear.

These values are best determined by forming a 1% composition of the polymer is deionised water, allowing this to age for 2 hours and then further diluting it to 0.1% active polymer. The ionicity of the polymer (y) is measured by Colloid Titration as described by Kock-Light Laboratories Limited in their publication 4/77 KLCD-1. (Alternatively the method described in BP No. 1,579,007 could possibly be used to determine y.) The ionicity after shear (x) is determined by measuring by the same technique the ionicity of the solution after subjecting it to standard shear.

The shear is best applied to 200 ml of the solution in a substantially cylindrical pot having a diameter of about 8 cm and provided in its base with a rotatable blade about 6 cm in diameter, one arm of the blade pointing upwards by about 45 degrees and the other downwards by about 45 degrees. The blade is about 1 mm thick and is rotated at 16,500 rpm in the base of the pot for 10 minutes. These conditions are best provided by the use of a Moulinex homogeniser but other satisfactory conditions can be provided using kitchen blenders such as Kenwood, Hamilton Beach, Iona or Osterizer blenders or a Waring Blendor.

In practice the precise conditions of shear are relatively unimportant since, provided the degree of shear is of the same order of magnitude as specified; it will be found that IR is not greatly affected by quite large changes in the amount, for instance the duration, of shear, whereas at lower amounts of shear (for instance 1 minute at 16,500 rpm) IR is greatly affected by small changes in shear.

Conveniently, therefore, the value of x is determined at the time when, with a high speed blade, further shear provides little or no further change in ionicity. This generally requires shearing for 10 minutes, but sometimes longer periods, e.g., up to 30 minutes with cooling, may be desired.

It should be understood that the defined shear is not shear that is applied to the polymer solution or to the flocculated suspension during the flocculation process of the invention but is instead shear that is applied as an analytical technique to permit definition of the properties of the polymers that may be used in the invention.

When using cross-linked polymeric material, polymers having IR of 15% have a relatively low degree of non-linearity whilst those having IR 90% have a high degree of non-linearity.

It is generally preferred for IR of polymer (b) to be below 90%. If IR is too low, the invention may give inadequate benefit compared to conventional polymers and preferably IR is above 20%. Best results are generally obtained at above 50%, preferably 50 to 85%.

Polymer (a) may contain a small amount of crosslinking (IR of about 15% or below), but is substantially linear.

A particularly preferred group of polymers for (a) and (b) includes copolymers of acrylamide with at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride.

Most preferred cationic monomer is quaternary ammonium and acid salts of dimethylaminoethyl (meth) acrylate, methyl chloride salt.

The cationic acrylamide polymers may comprise 10 to 90% by weight acrylamide and 10 to 90% by weight cationic monomer(s).

The intrinsic viscosity of polymer (a) may be from 1 to 14 dl/g, preferably from 6 to 11 dl/g.

The intrinsic viscosity of polymer (b) may be from 1 to 10 dl/g, preferably from 1 to 4 dl/g.

The invention is suited to a variety of processes involving flocculation and dewatering. Processes of particular relevance include dewatering sewage sludges, dewatering mineral suspensions, dewatering of paper mill sludges, dewatering of deinked cellulosic sludges e.g. from paper deinking plants and also papermaking processes.

The present invention provides improved flocculation, including improved drainage times.

The following examples serve to illustrate the invention.

EXAMPLE 1

Reverse phase emulsion of a copolymer of acrylamide with dimethylaminoethyl acrylate, methyl chloride quaternary ammonium (20/80 weight/weight), intrinsic viscosity of 10.3 dl/g, is prepared at 1% concentration in deionised water, then diluted to a concentration of 0.25%. The polymer has an ionic regain of 7%. This shall be referred to as the aqueous preparation of polymer (a).

Reverse phase emulsion of a crosslinked copolymer of acrylamide with dimethylaminoethyl acrylate, methyl chloride quaternary ammonium (20/80 weight/weight), intrinsic viscosity of 2.0 dl/g, is prepared at 1% concentration in deionised water, then diluted to a concentration of 0.25%. The polymer has an ionic regain of 75%. This shall be referred to as the aqueous preparation of polymer (b).

As a control, a 50:50 blend of polymer (a) and (b) is also produced.

500 ml aliquots of diluted Rotherham (Yorkshire, England) sewage sludge (diluted 2:3 with tap water) are treated with polymer (a) then polymer (b) is added after a delay of 2, 6, 10 and 14 seconds, over a doseage range.

500 ml aliquots of diluted Rotherham (Yorkshire, England) sewage sludge (diluted 2:3 with tap water) are treated with half of the control blend then the other half of the control blend is added after a delay of 2, 6, 10 and 14 seconds, over a doseage range.

The treated sludge is mixed at 4000 rpm for 15 seconds. The flocculation efficiency is measured by free drainage using a 8 cm diameter sieve.

The free drainage results are shown in Table 1.

TABLE 1

| Dose (mg/l) | Delay between addition of polymer (a) and polymer (b) | | | | Delay between addition of first 50% blend and second 50% blend | | | |
|---|---|---|---|---|---|---|---|---|
| | 2 s | 6 s | 10 s | 14 s | 2 s | 6 s | 10 s | 14 s |
| | 5 s filtrate volume (ml) | | | | 5 s filtrate volume (ml) | | | |
| 100 | 100 | 210 | 280 | 350 | 120 | 140 | 280 | 350 |
| 120 | 360 | 380 | 380 | 400 | 310 | 350 | 330 | 340 |
| 140 | 400 | 440 | 450 | 410 | 360 | 400 | 380 | 340 |

TABLE 1-continued

| Dose (mg/l) | Delay between addition of polymer (a) and polymer (b) | | | | Delay between addition of first 50% blend and second 50% blend | | | |
|---|---|---|---|---|---|---|---|---|
| | 2 s | 6 s | 10 s | 14 s | 2 s | 6 s | 10 s | 14 s |
| | 5 s filtrate volume (ml) | | | | 5 s filtrate volume (ml) | | | |
| 160 | 420 | 430 | 450 | 420 | 380 | 390 | 390 | 330 |
| 180 | 430 | 430 | 445 | 430 | 400 | 390 | 380 | 300 |
| 200 | 430 | | | 440 | 390 | | | |
| 220 | | | | 420 | | | | |

The results clearly show the improved drainage times upon using the sequential addition of linear then structured polymer.

The invention claimed is:

1. A process of flocculating and dewatering an aqueous suspension of suspended solids comprising, introducing into the suspension,
   (a) substantially linear cationic polymer,
   (b) structured polymer,
in which polymer (b) has ionic regain greater than 20% and is cationic wherein said ionic regain is calculated as $(x-y)/x$ multiplied by 100 where x is the ionicity of the polymer (b) measured after applying standard shear and y is the ionicity of the polymer (b) before applying standard shear characterised in that the polymers are introduced into the substrate sequentially and polymer (a) is added first then polymer (b) to flocculate said suspended solids, and dewatering said aqueous suspension, wherein polymers (a) and (b) are copolymers of acrylamide and at least one cationic monomer selected from the group consisting of quaternary ammonium and acid salts of dimethyaminoethyl (meth) acrylate, quaternary ammonium and acid salts of dimethylaminoethyl (meth) acrylamide, and diallyldimethyl ammonium chloride.

2. A process according to claim 1 in which the polymer (a) is an aqueous preparation of a water in oil emulsion or a polymer in oil dispersion, or an aqueous polymer dispersion or an aqueous preparation of a solid grade polymer.

3. A process according to claim 1 in which polymer (b) is an aqueous preparation of a water in oil emulsion or a polymer in oil dispersion, or an aqueous preparation of a solid grade polymer.

4. A process according to claim 1 in which polymer (b) has ionic regain greater than 50%.

5. A process according to claim 1 in which the dewatering process is selected from the group consisting of dewatering sewage sludge, dewatering a mineral suspension, dewatering a paper mill sludge, dewatering a deinked cellulosic sludge and a papermaking process.

6. A process according to claim 1 in which polymer (b) is added after flocculation has commenced but before the dewatering stage and before any high shear stage.

* * * * *